(12) United States Patent
Kawada et al.

(10) Patent No.: US 10,569,331 B2
(45) Date of Patent: Feb. 25, 2020

(54) THREE-DIMENSIONAL PRINTER

(71) Applicant: Sodick Co., Ltd., Kanagawa (JP)

(72) Inventors: Shuichi Kawada, Kanagawa (JP);
Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 163 days.

(21) Appl. No.: 15/605,911

(22) Filed: May 25, 2017

(65) Prior Publication Data
US 2017/0348771 A1    Dec. 7, 2017

(30) Foreign Application Priority Data

Jun. 1, 2016 (JP) .................................. 2016-109991

(51) Int. Cl.
| | |
|---|---|
| *B22F 3/105* | (2006.01) |
| *B33Y 30/00* | (2015.01) |
| *B33Y 50/02* | (2015.01) |
| *B29C 64/255* | (2017.01) |
| *B33Y 40/00* | (2020.01) |
| *B29C 64/307* | (2017.01) |
| *B29C 64/357* | (2017.01) |
| *B29C 64/35* | (2017.01) |

(52) U.S. Cl.
CPC .......... *B22F 3/1055* (2013.01); *B29C 64/255* (2017.08); *B29C 64/307* (2017.08); *B29C 64/35* (2017.08); *B29C 64/357* (2017.08); *B33Y 30/00* (2014.12); *B33Y 40/00* (2014.12); *B33Y 50/02* (2014.12); *B22F 2003/1057* (2013.01); *B22F 2003/1059* (2013.01); *Y02P 10/24* (2015.11); *Y02P 10/295* (2015.11)

(58) Field of Classification Search
CPC ... B29C 64/307; B29C 64/357; B29C 64/255; B29C 64/35
See application file for complete search history.

(56) References Cited

U.S. PATENT DOCUMENTS

| 7,435,368 | B2 * | 10/2008 | Davidson | ................ B29C 41/12 264/113 |
|---|---|---|---|---|
| 7,686,995 | B2 * | 3/2010 | Davidson | ................ B29C 41/12 264/113 |

(Continued)

FOREIGN PATENT DOCUMENTS

| JP | 2001334583 | 12/2001 |
|---|---|---|
| JP | 2002292751 | 10/2002 |

(Continued)

*Primary Examiner* — Xiao S Zhao
*Assistant Examiner* — Emmanuel S Luk
(74) *Attorney, Agent, or Firm* — JCIPRNET

(57) ABSTRACT

A three-dimensional printer (1) includes a material supply device (3) that supplies material powder to a table which is movable vertically, a powder retaining wall (26) that surrounds the table and retains the material powder, a material-recovery bucket (30) that accommodates excess material powder and impurities discharged from the powder retaining wall, an impurity removing device (43) that removes the impurities from the material powder, and a material drying device (47) that dries the material powder. The material powder from which the impurities have been removed and which has been dried is returned and recycled to the material supply device.

6 Claims, 2 Drawing Sheets

(56) References Cited

U.S. PATENT DOCUMENTS

| | | | |
|---|---|---|---|
| 7,887,316 B2 * | 2/2011 | Cox | B01F 3/188 264/308 |
| 2001/0045678 A1 | 11/2001 | Kubo et al. | |
| 2006/0214335 A1 * | 9/2006 | Cox | B01F 3/188 264/497 |
| 2010/0031882 A1 | 2/2010 | Abe et al. | |
| 2015/0034123 A1 * | 2/2015 | Pressacco | B08B 5/02 134/10 |
| 2015/0104346 A1 | 4/2015 | Nakamura et al. | |
| 2015/0321256 A1 | 11/2015 | Abe et al. | |
| 2015/0367573 A1 | 12/2015 | Okazaki et al. | |
| 2016/0067781 A1 | 3/2016 | Kawada et al. | |
| 2016/0144431 A1 * | 5/2016 | Wiesner | B29C 64/35 419/53 |
| 2016/0193696 A1 * | 7/2016 | McFarland | B22F 3/1055 219/76.12 |
| 2016/0271887 A1 * | 9/2016 | Shi | B01D 45/12 |
| 2016/0361874 A1 * | 12/2016 | Park | B29C 64/35 |
| 2017/0036404 A1 * | 2/2017 | Rengers | B29C 64/153 |
| 2018/0021855 A1 * | 1/2018 | De Lajudie | B33Y 10/00 419/26 |
| 2018/0339466 A1 * | 11/2018 | El Naga | B29C 64/153 |
| 2019/0001413 A1 * | 1/2019 | Golz | B29C 64/357 |

FOREIGN PATENT DOCUMENTS

| | | |
|---|---|---|
| JP | 2010037599 | 2/2010 |
| JP | 4561187 | 10/2010 |
| JP | 2015096646 | 5/2015 |
| JP | 2016006214 | 1/2016 |
| JP | 2016055462 | 4/2016 |
| JP | 2016056417 | 4/2016 |

\* cited by examiner

THREE-DIMENSIONAL PRINTER

CROSS-REFERENCE TO RELATED APPLICATION

This application claims the priority benefit of Japan Application no. 2016-109991, filed on Jun. 1, 2016. The entirety of the above-mentioned patent application is hereby incorporated by reference herein and made a part of this specification.

BACKGROUND OF THE INVENTION

Field of the Invention

The present invention relates to a three-dimensional printer. Particularly, the present invention relates to a three-dimensional printer that recovers an excess of material powder supplied into a chamber, removes impurities therefrom, and then supplies the resultant material powder to the chamber again.

Description of Related Art

In lamination molding of metal using a laser beam, a desired three-dimensional object including a plurality of sintered layers is formed by repeating operations of supplying material powder onto a table, which is disposed in a chamber as a build chamber filled with inert gas and is movable vertically, to form a powder layer by a material supply device, irradiating a predetermined part of the powder layer with a laser beam to sinter the material powder at the irradiated position, and stacking the sintered layers. In lamination molding using a cutting unit in a chamber, cutting may be performed on an object during molding or a molded object.

In a three-dimensional printer disclosed in US 2016/0067781, a table which is movable vertically inside a powder retaining wall is lowered to a position of a powder discharging section and excess material powder along with impurities such as spatters and cutting chips is discharged to a bucket outside the powder retaining wall. Further, excess material powder scraped by a blade along with the impurities when forming a powder layer is discharged to the bucket. The material powder in the bucket is sieved with a sieve by an operator to remove the impurities and is then returned to a material supply device by the operator.

In a powder material recycling device in manufacturing a three-dimensional object, which is disclosed in Japanese Patent No. 4561187, material components of a powder material from which cutting chips have been removed using a sieve are inspected and a powder material replenished with lacking material components based on the inspection result is supplied again onto a table.

In a three-dimensional molding device disclosed in Japanese Unexamined Patent Application Publication No. 2002-292751, a residual powder material which has been recovered into a powder recovery tank by a powder conveying unit using a cyclone separator is conveyed to a hopper of a material supply unit and is supplied again to a molding stage. In the three-dimensional molding device disclosed in Japanese Unexamined Patent Application Publication No. 2002-292751, powder intake efficiency is increased by providing a shutter mechanism in the cyclone separator and providing a sufficient closed structure in a state in which the shutter mechanism is closed.

SUMMARY OF THE INVENTION

However, while non-sintered material powder which is recycled along with impurities is discharged into the bucket outside the powder retaining wall, has the impurities removed therefrom, and is then supplied to the material supply device again, for example, there is concern that powder grains may absorb ambient moisture in the bucket partially due to an ambient environment of the three-dimensional printer, are likely to stick to each other as an aggregate, and degrade circulation of the material in the material supply device. Accordingly, there is a likelihood that long-time automated lamination molding work will be hindered.

Therefore, an object of the present invention is to enable smooth formation of a powder layer using recycled non-sintered material powder and to enable long automation of lamination molding work while maintaining high processing accuracy.

According to the invention, there is provided a three-dimensional printer (1) including: a chamber (2) that covers a molding region (R) on a base (4) and is filled with inert gas at a predetermined concentration; a table (5) that is disposed in the molding region (R) in the chamber (2) and is movable vertically; a material supply device (3) that supplies non-sintered material powder onto the table (5); a powder retaining wall (26) that surrounds the table (5) and retains the material powder supplied from the material supply device (3) onto the table (5); a material-recovery bucket (30) that accommodates excess material powder discharged from the powder retaining wall (26) along with impurities; an impurity removing device (43) that removes the impurities from the material powder including impurities in the material-recovery bucket (30); and a material drying device (47) that dries the material powder which is returned from the material-recovery bucket (30) to the material supply device (3), wherein the material powder from which the impurities have been removed by the impurity removing device (43) is returned and recycled to the material supply device (3).

According to the invention, it is possible to enable smooth formation of a powder layer using recycled non-sintered material powder and to enable long automation of lamination molding work while maintaining high processing accuracy.

DETAILED DESCRIPTION OF THE INVENTION

Figure 2:
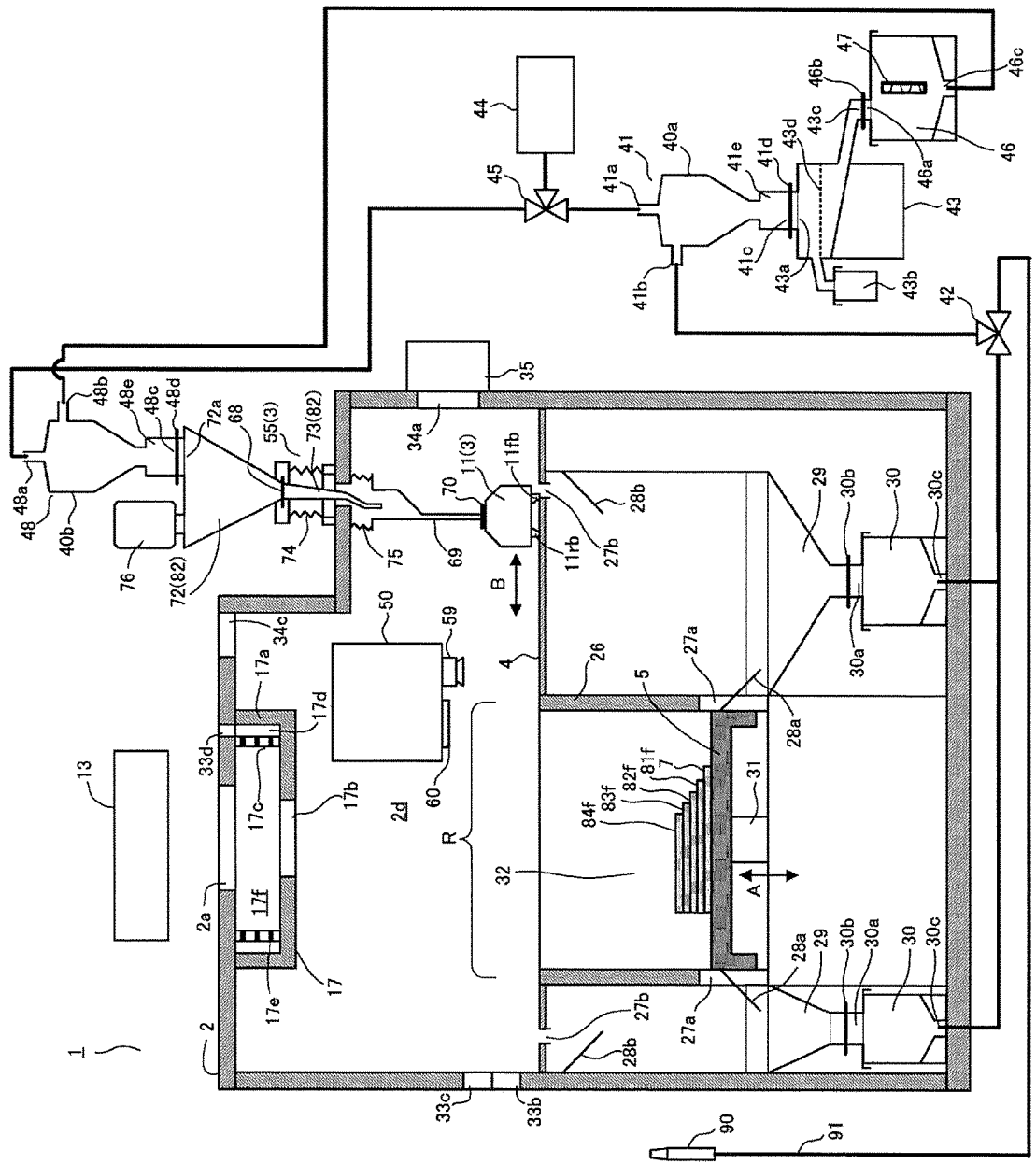
FIG. 2 is a schematic diagram illustrating an example of the three-dimensional printer according to the embodiment of the invention after lamination molding is completed.

Hereinafter, an embodiment of the invention will be described with reference to the accompanying drawings. Various features described in the following embodiment can be combined with each other. In FIG. 2, an inert gas supply and discharge system is omitted.

Figure 1:
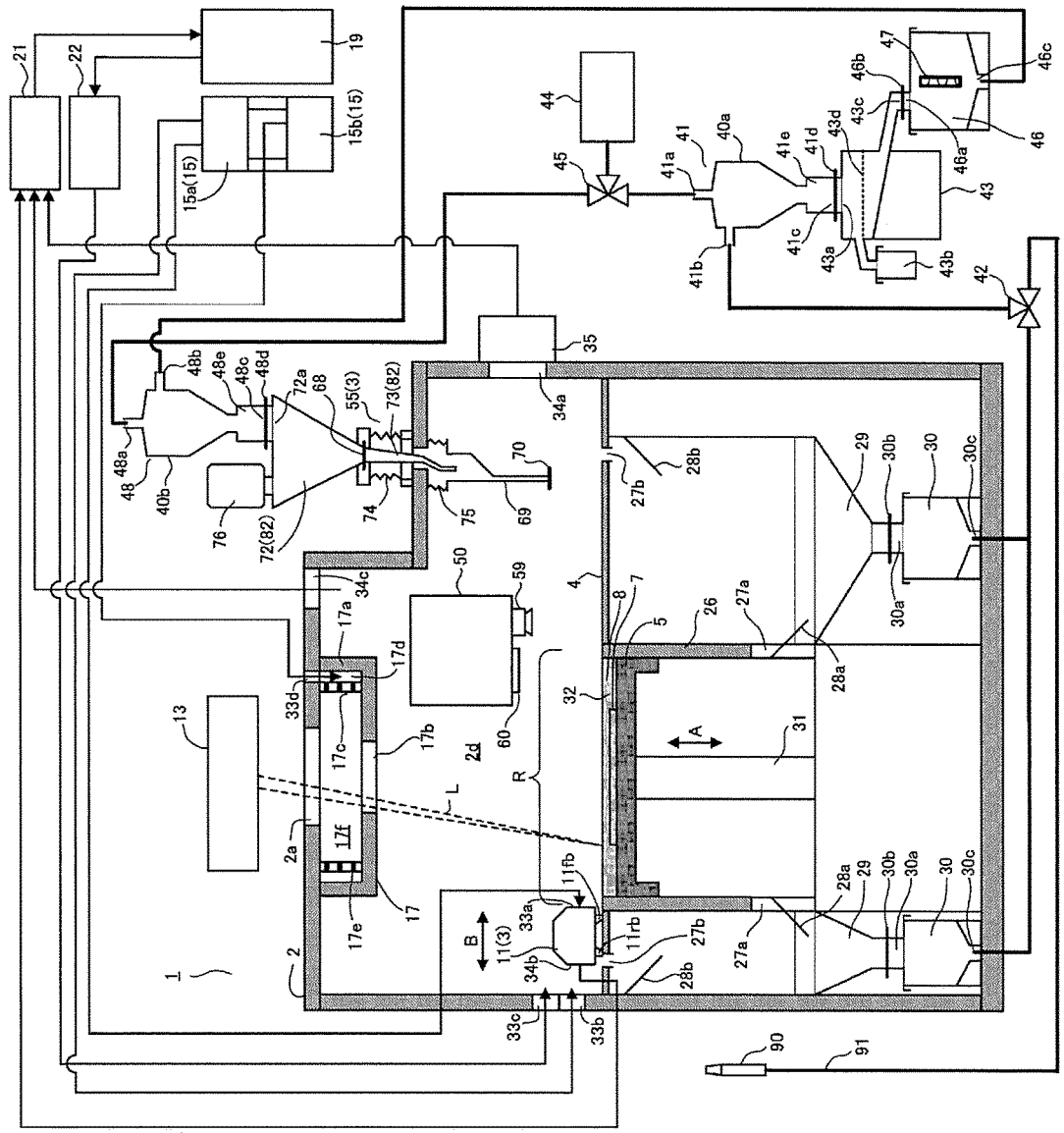
FIG. 1 is a schematic diagram illustrating an example of a three-dimensional printer according to an embodiment of the invention during lamination molding.

As illustrated in FIG. 1, a three-dimensional printer 1 includes a base 4, a chamber 2 that covers a necessary molding region R on the base 4, a table 5 that is disposed in the molding region R and moves vertically, a material supply device 3 that supplies material powder to the molding region R, and a laser beam irradiation unit 13 that irradiates the material powder with a laser beam L to sinter the material powder.

The chamber 2 is filled with inert gas at a predetermined concentration. The table 5 is driven by a table driving mechanism 31 such that it is movable in an up-down direction (in a direction of arrow A in FIG. 1). The molding region R is disposed on the table 5. The material supply device 3 includes a recoater head 11 and a material replenishing unit 55. The recoater head 11 is disposed on the base 4 and is movable in one horizontal axis direction (a direction of arrow B in FIG. 1). The recoater head 11 supplies material powder to the molding region R to form a powder layer 8 while moving in the chamber 2. The material replenishing unit 55 replenishes the recoater head 11 with material powder from the outside of the chamber 2. The laser beam irradiation unit 13 irradiates a predetermined part of the powder layer 8 with a laser beam L to sinter the material powder at the irradiated position and to form a sintered layer. The three-dimensional printer 1 may include a cutting device 50 in the chamber 2 to improve dimensional accuracy and surface finish of an object being molded.

A powder retaining wall 26 is disposed around the table 5. A powder retaining space 32 is a space surrounded by the powder retaining wall 26 and the table 5 and retains non-sintered material powder. As illustrated in FIG. 2, the powder retaining wall 26 has a lower powder discharging portion 27a, which can discharge material powder in the powder retaining space 32, on a lower part thereof. When the table 5 moves down to a predetermined position after molding is completed, the lower powder discharging portion 27a communicates with the powder retaining space 32 and discharges excess non-sintered material powder into which impurities such as spatters and cutting chips (hereinafter simply referred to as impurities) are mixed. The discharged material powder is guided to a chute 29 by a lower chute guide 28a and is accommodated in a material-recovery bucket 30 via the chute 29.

At least one upper powder discharging portion 27b is formed in the top surface of the base 4 and outside the powder retaining wall 26 and communicates with a material-recovery bucket 30. The excess non-sintered material powder and the impurities which are extruded from the recoater head 11 are discharged from the upper powder discharging portion 27b, are guided to a chute 29 by an upper chute guide 28b, and are accommodated in the material-recovery bucket 30. The upper powder discharging portion 27b may be configured to be opened and closed in a timely manner by a shutter which is not illustrated. A shutter 30b that can open and close a supply port 30a of the material-recovery bucket 30 in a timely manner may be disposed between the chute 29 and the material-recovery bucket 30.

The material replenishing unit 55 includes a main duct 82 and an intermediate duct 69. The main duct 82 accommodates excess non-sintered material powder in the material-recovery bucket 30 as will be described later and accommodates new material powder supplied from a material tank 76 if necessary. The main duct 82 supplies material powder supplied to a main duct top 72 to the intermediate duct 69 via a main duct bottom 73. An outlet of the main duct 82 is opened and closed by a main duct shutter 68. A bellows 74 is disposed between the main duct 82 and the chamber 2. The intermediate duct 69 supplies material powder to the recoater head 11. An outlet of the intermediate duct 69 is opened and closed by an intermediate duct shutter 70. A bellows 75 is disposed between the intermediate duct 69 and the chamber 2.

The recoater head 11 includes a material accommodating section that accommodates material powder supplied from a top opening and discharges the material powder from a material discharge port on the bottom. The shape of the material discharge port is a slit-like long and thin shape which is perpendicular to a moving direction (the direction of arrow B in FIG. 1) of the recoater head 11. The recoater head 11 includes blades 11fb and 11rb, which planarize material powder discharged from a material discharge port 11c to form a powder layer 8, on both side surfaces. The material powder is, for example, spherical metal powder (for example, iron powder) with an average particle diameter of 20 μm. The recoater head 11 includes a first supply port 33a and a second discharge port 34b on opposite side surfaces along one horizontal axis direction perpendicular to the moving direction (the direction of arrow B in FIG. 1) of the recoater head 11 to supply and discharge inert gas. The inert gas is a gas which does not substantially react with the material powder, such as nitrogen gas, argon gas, or helium gas.

The recoater head 11 detects an amount of material powder accommodated using a sensor, and moves just below the intermediate duct 69 when it is determined that replenishment is necessary. Then, the tip of the intermediate duct 69 in which the intermediate duct shutter 70 is closed is inserted from a top opening of a material accommodating section. The intermediate duct shutter 70 is opened to supply material powder to the material accommodating section. When supply of material powder is completed, the intermediate duct shutter 70 is closed. The tip of the intermediate duct 69 is taken out of the top opening of the material accommodating section, and the recoater head 11 moves away from the material replenishing unit 55. The main duct shutter 68 is opened in a timely manner when material powder is supplied to the intermediate duct 69.

The laser beam irradiation unit 13 is disposed above the chamber 2 and outputs a laser beam L. The laser beam irradiation unit 13 is configured to two-dimensionally scan with the laser beam L. For example, the laser beam irradiation unit 3 includes a laser beam source, which is not illustrated, generating a laser beam L and a pair of galvanometer scanners, which is not illustrated, two-dimensionally scanning the molding region R with the laser beam L. The laser beam L passes through a window 2a disposed in the chamber 2 and is applied to a powder layer 8 formed in the molding region R. The laser beam L is not particularly limited in type as long as it can sinter material powder, and examples thereof include a $CO_2$ laser beam, a fiber laser beam, and a YAG laser beam. The window 2a is formed of a material which can transmit the laser beam L. For example, when the laser beam L is a fiber laser beam or a YAG laser beam, the window 2a can be formed of quartz glass.

The three-dimensional printer 1 may include a cutting device 50 in the chamber 2. The cutting device 50 moves a machining head 57 to a desired position in a controllable manner using a machining head driving mechanism which is not illustrated. The machining head 57 includes a spindle head 60 and an imaging unit 59. The spindle head 60 has a rotary cutting tool such as an end mill, which is not illustrated, attached thereto and rotates the rotary cutting tool to cut a surface or an unnecessary part of a sintered layer. The rotary cutting tool can be replaced with another rotary cutting tool during molding by an automatic tool replacing device which is not illustrated. The imaging unit 59 is, for example, a CCD camera. The imaging unit 59 is used for a process of correcting a laser beam irradiation position, a process of correcting a main spindle position, a correcting process of matching the laser beam irradiation position with the main spindle position, and the like.

An inert gas supply and discharge system includes a fume diffusing device 17, an inert gas supply device 15, a fume collector 19, duct boxes 21 and 23, and pipes connecting them. The inert gas supply and discharge system supplies inert gas such that the chamber 2 is always filled with inert gas at a predetermined concentration or more and discharges inert gas, which has been contaminated with fumes generated by irradiation with a laser beam L, from the chamber 2.

A supply port for inert gas includes a first supply port 33a, a second supply port 33b, a sub supply port 33c, and a fume diffusing device supply port 33d. A discharge port for inert gas includes a first discharge port 34a, a second discharge port 34b, and a sub discharge port 34c.

The first discharge port 34a is disposed on a side plate of the chamber 2. An inert gas suction device 35 is connected to the first discharge port 34a. The second supply port 33b is disposed on an end of the base 4 to face the first discharge port 34a with a predetermined irradiation region interposed therebetween. The first supply port 33a is disposed on a side surface of the recoater head 11 opposite to the first discharge port 34a. The second discharge port 34b is disposed on a side surface of the recoater head 11 opposite to the surface on which the first supply port 33a is disposed.

The sub supply port 33c is disposed on a side plate of the chamber 2 to face the first discharge port 34a. The sub discharge port 34c is disposed on the top surface of the chamber 2. The fume diffusing device supply port 33d is disposed on the top surface of the chamber 2 and supplies inert gas to the fume diffusing device 17.

The fume diffusing device 17 is disposed on the top surface of the chamber 2 to cover the window 2a. In the fume diffusing device 17, a cylindrical diffusing member 17c having a plurality of pores 17e formed therein is disposed in a cylindrical housing 17a and an opening 17b is formed on the bottom surface of the housing 17a corresponding to the inside of the diffusing member 17c. An inert gas supplying space 17d is disposed between the housing 17a and the diffusing member 17c. A clean space 17f is disposed inside the diffusing member 17c. The fume diffusing device 17 fills the clean space 17f with clean inert gas supplied to the inert gas supplying space 17d via the pores 17e and discharges the clean inert gas to the lower side of the fume diffusing device 17 via the opening 17b. The fume diffusing device 17 causes the clean inert gas to flow along an irradiation route of the laser beam L to exclude fume from the irradiation route of the laser beam L, thereby preventing the window 2a from being contaminated by fumes.

The inert gas supply device 15 includes a first inert gas supply device 15a and a second inert gas supply device 15b. The first inert gas supply device 15a supplies clean inert gas to the chamber 2 via the first supply port 33a and the second supply port 33b. The second inert gas supply device 15b sends inert gas including fume discharged from the chamber 2 via the first discharge port 34a, the second discharge port 34b, and the sub discharge port 34c to the fume collector 19 via the duct box 21, and supplies clean inert gas from which fumes have been removed in the fume collector 19 to the chamber 2 again via the duct box 23 and the sub supply port 33c.

The three-dimensional printer 1 laminates and molds an object on a molding plate 7 placed on the table 5. The table 5 is adjusted to an appropriate height. The recoater head 11 moves from the right side of the molding region R to the left side in the direction of arrow B in FIG. 1 and forms a first powder layer 8 on the molding plate 7. The laser beam irradiation unit 13 irradiates a predetermined part of the powder layer 8 with a laser beam L to foil a first sintered layer 81f. The table 5 moves down by a height corresponding to one layer of the powder layer 8. The recoater head 11 moves from the left side of the molding region R to the right side and forms a second powder layer 8 on the sintered layer 81f. The laser beam irradiation unit 13 irradiates a predetermined part of the powder layer 18 with a laser beam L to form a second sintered layer 82f. By repeating the above-mentioned processes, a third sintered layer 83f and desired sintered layers subsequent thereto are formed.

In the three-dimensional printer 1, the cutting device 50 is disposed in the chamber 2 and a surface or an unnecessary part of a sintered compact obtained by laminating the sintered layers may be machined, for example, whenever a predetermined number of sintered layers are formed during molding of an object.

The three-dimensional printer 1 completes the lamination molding when a necessary number of sintered layers are formed. The table 5 moves down slightly whenever a sintered layer is formed. The powder retaining space 32 surrounded by the table 5 and the powder retaining wall 26 accommodates a molded object, excess non-sintered material powder, and impurities. The impurities include spatters which are slightly scattered when material powder is sintered with a laser beam L. The impurities include cutting chips which are cut out when a surface or an unnecessary part of a sintered compact is cut.

When the lamination molding is completed, the table 5 is moved down to the lower powder discharging portion 27a. As a result the excess non-sintered material powder and the impurities are guided from the chute guide 28a to the chute 29 and are accommodated in the material-recovery bucket 30 via the chute 29.

The excess non-sintered material powder and the impurities are extruded out of the powder retaining wall 26 by the blades 11fb and 11rb of the recoater head 11, fall from the upper powder discharging portion 27b outside the powder retaining wall 26, are guided to the chute 29 from the upper chute guide 28b, and are accommodated in the material-recovery bucket 30 via the chute 29.

As illustrated in FIGS. 1 and 2, the three-dimensional printer 1 includes a material-recovery conveying device 41 that conveys material powder including impurities in the material-recovery bucket 30, an impurity removing device 43 that removes impurities from the material powder including impurities which is conveyed by the material-recovery conveying device 41, a material-supply bucket 46 that accommodates the material powder from which impurities have been removed by the impurity removing device 43, a material drying device 47 that dries the material powder in the material-supply bucket 46, and a material-supply conveying device 48 that conveys the material powder dried by the material drying device 47 to the material supply device 3.

The material-recovery conveying device 41 and the material-supply conveying device 48 include a suction device 44 that has a suction force for suctioning gas and solid together and cyclone type filters 40a and 40b that separate solids from gas before suctioning gas and solids into the suction device 44 and does not suction solids into the suction device 44.

The suction device 44 may be shared by the material-recovery conveying device 41 and the material-supply conveying device 48. One suction device 44 may be switchably connected to one of the material-recovery conveying device 41 and the material-supply conveying device 48 by a switching valve 45. The suction device 44 may be included in each of the material-recovery conveying device 41 and the material-supply conveying device 48. For example, a cleaner may be employed as the suction device 44. As illustrated in FIGS. 1 and 2, the material-recovery conveying device 41, the material-supply conveying device 48, the suction device 44, and the switching valve 45 may be connected to each other by pipes.

The cyclone type filters 40*a* and 40*b* (hereinafter simply referred to as filters 40*a* and 40*b*) have respective upper vertical cylinders and lower converging cones. Exhaust ports 41*a* and 48*a* connected to the suction device 44 are disposed at the top of and coaxially with the upper vertical cylinders of filters 40*a* and 40*b*, respectively. A suction port 41*b* is disposed on the upper vertical cylinder of the filter 40*a* and a suction port 48*b* is disposed on the upper vertical cylinder of the filter 40*b*. A discharge port 41*c* which is connected to a supply port 43*a* of the impurity removing device 43 and which causes separated-out solids to fall to the outside is disposed on the bottom of the lower converging cone of the filter 40*a*. A discharge port 48*c* which is connected to a supply port 72*a* of the material supply device 3 and which causes separated-out solids to fall to the outside is disposed on the bottom of the lower converging cone of the filter 40*b*.

The filters 40*a* and 40*b* may be provided with shutters 41*d* and 48*d* that open and close the discharge ports 41*c* and 48*c* in a timely manner. The shutters 41*d* and 48*d* may be configured to close the discharge ports 41*c* and 48*c* in order to enhance suction efficiency at the time of suction and to be opened in a timely manner when accumulated solids drop to the outside. In the filters 40*a* and 40*b*, tanks 41*e* and 48*e* that temporarily collect separated-out solids until the shutters 41*d* and 48*d* are opened may be disposed just above the discharge ports 41*c* and 48*c*.

The filters 40*a* and 40*b* move solids having a larger specific gravity than gas in a spiral air flow generated therein to the outside of the air flow by a centrifugal force, discharge solids, which lose momentum due to friction between the solids and the inner wall and fall due their own weight, from the discharge ports 41*c* and 48*c*, and cause the suction device 44 to suction only gas from the exhaust ports 41*a* and 48*a*.

The material-recovery conveying device 41 includes the filter 40*a*. The suction port 41*b* of the filter 40*a* is connected to the discharge port 30*c* of the material-recovery bucket 30. The discharge port 41*c* of the filter 40*a* is connected to the supply port 43*a* of the impurity removing device 43. The material-recovery conveying device 41 conveys the non-sintered material powder including impurities, which has been collected in the material-recovery bucket 30, to the impurity removing device 43. In the material-recovery bucket 30, a shutter 30*b* may be disposed in the supply port 30*a* and may be closed during conveyance such that inert gas in the chamber 2 is not suctioned. The material-recovery bucket 30 may be provided with a vent that brings gas from the outside to the inside by a suction force during conveyance.

The material-recovery conveying device 41 may be provided with a switching valve 42, a manual cleaning nozzle 90, and a flexible hose 91. One end of the hose 91 is connected to the manual cleaning nozzle 90 and the other end thereof is connected to the switching valve 42. The switching valve 42 switchably connects one of the discharge port 30*c* of the material-recovery bucket 30 and the hose 91 to the suction port 41*b* of the filter 40*a*. An operator manually moves the manual cleaning nozzle 90 to a desired place in the chamber 2 and suctions non-sintered material powder or impurities for cleaning.

The impurity removing device 43 may be a sieve device 43 including a sieve 43*d*. A mesh of the sieve 43*d* has dimensions that do not allow impurities such as spatters and cutting chips which are larger than the particle size of the non-sintered material powder to pass through. The sieve 43*d* vibrates. The sieve device 43 supplies the non-sintered material powder including impurities conveyed from the material-recovery conveying device 41 to the vibrating sieve 43*d* from the supply port 43*a* and sorts the non-sintered material powder including impurities into non-sintered material powder passing through the mesh and impurities not passing through the mesh and remaining on the sieve 43*d*. The non-sintered material powder is accommodated in the material-supply bucket 46 connected to a discharge port 43*c* of the sieve device 43. The impurities are accommodated in an impurity-recovery bucket 43*b*. The impurity removing device 43 can employ various sorting units without departing from the gist of the invention.

The material-supply bucket 46 may be provided with a shutter 46*b* that opens and closes a supply port 46*a* in a timely manner. The shutter 46*b* may be opened only when the non-sintered material powder is accommodated in the material-supply bucket 46 from the sieve device 43.

The material drying device 47 dries material powder which is returned from the material-recovery bucket 30 to the material supply device 3. As illustrated in FIGS. 1 and 2, the material drying device 47 may dry the non-sintered material powder, which is accommodated in the material-supply bucket 46, in the material-supply bucket 46. An independent conveying device that conveys the material powder from the material-supply bucket 46 to the material drying device 47 may be omitted. The material drying device 47 may include a heat source that directly heats the non-sintered material powder in the material-supply bucket 46. The material drying device 47 may include a heat source that indirectly heats the non-sintered material powder by keeping the atmosphere in the material-supply bucket 46 at a high temperature. The material drying device 47 may employ various drying units without departing from the gist of the invention.

As illustrated in FIGS. 1 and 2, the material drying device 47 is an electrical rod-shaped cartridge heater. The cartridge heater 47 is disposed vertically at the center of the inside of the material-supply bucket 46. Without departing from the gist of the invention, the material drying devices 47 may be configured such that a desired number of heaters of a desired heating type are disposed at desired positions in the material-supply bucket 46 in a desired shape in a desired orientation.

The material drying device 47 may include an independent material drying bucket other than the material-supply bucket 46 shared by the impurity removing device 43. In this case, an independent conveying device that conveys non-sintered material powder in the material-supply bucket 46 to a material drying bucket which is not illustrated is provided. The material drying device 47 can be disposed at an appropriate position after excess non-sintered material powder is discharged to the material-recovery bucket 30 until it is supplied to the material supply device 3 again.

The material drying device 47 can be disposed outside the three-dimensional printer 1 such that a drying heat source can be prevented from causing a thermal influence such as thermal expansion of a part of the three-dimensional printer 1 to hinder high-accuracy machining by the three-dimensional printer 1. As illustrated in FIGS. 1 and 2, the three-dimensional printer 1 includes the material-recovery conveying device 41 that conveys material powder including impurities from the material-recovery bucket 30 to the impurity removing device 43, the material-supply bucket 46 that accommodates material powder from which impurities have been removed by the impurity removing device 43, and the material-supply conveying device 48 that conveys material powder from the material-supply bucket 46 to the material supply device 3, and the material drying device 47 that dries the material powder accommodated in the material-supply bucket 46. The material-supply bucket 46 can be disposed separated from the base 4, the chamber 2, and the material supply device 3 so as not to cause a thermal influence on the base 4, the chamber 2, and the material supply device 3.

The material-supply conveying device 48 includes the filter 40b. A suction port 48b of the filter 40b is connected to the discharge port 46c of the material-supply bucket 46. A discharge port 48c of the filter 40b is connected to the supply port 72a of the main duct top 72 in the material supply device 3. As illustrated in FIGS. 1 and 2, the filter 40b is installed on the main duct 82 of the material supply device 3. The material-supply conveying device 48 conveys the dried non-sintered material powder collected in the material-supply bucket 46 to the material supply device 3 in a timely manner. The material-supply bucket 46 may include a vent that brings gas from outside of the material-supply bucket 46 to the inside thereof by a suction force during conveyance.

The material supply device 3 may prevent a decrease of the suction force by closing the main duct shutter 68 instead of the shutter 48d. In the material supply device 3, the tank 48e may be omitted and the non-sintered material powder may be collected on the main duct top 72.

The three-dimensional printer 1 includes a controller, which is not illustrated, controlling operations of various devices. The controller controls the three-dimensional printer 1 such that non-sintered material powder is supplied onto the table 5 which moves vertically in the chamber 2 filled with inert gas at a predetermined concentration, excess non-sintered material powder and impurities discharged out of the powder retaining wall 26 which surrounds the table 5 and retains the non-sintered material powder are recovered together, the impurities are removed from the non-sintered material powder including impurities, and the non-sintered material powder from which impurities have been removed is supplied onto the table 5 again, when lamination molding is performed using non-sintered material powder. The controller controls the three-dimensional printer 1 such that the non-sintered material powder is dried before the recovered non-sintered material powder including impurities is supplied onto the table 5 for recycle.

The three-dimensional printer 1 repeatedly performs operations of conveying non-sintered material powder including impurities in the material-recovery bucket 30 to the impurity removing device 43 using the material-recovery conveying device 41, accommodating the non-sintered material powder from which impurities have been removed by the impurity removing device 43 in the material-supply bucket 46, drying the non-sintered material powder in the material-supply bucket 46 using the material drying device 47, and conveying the non-sintered material powder in the material-supply bucket 46 to the material supply device 3 using the material-supply conveying device 48, if necessary. The devices may be simultaneously activated if necessary when the devices can operate simultaneously.

The invention can be applied to a configuration in which at least the material-supply bucket 46 is shared by a plurality of three-dimensional printers 1, material powder in the material-recovery bucket 30 of a desired three-dimensional printer 1 among the plurality of three-dimensional printers 1 is accommodated in the material-supply bucket 46 at a desired timing, and the material powder in the material-supply bucket 46 is supplied to the material supply device 3 of the desired three-dimensional printer 1 among the plurality of three-dimensional printers 1 at a desired timing. A plurality of three-dimensional printers 1 can operate automatically for a long time while keeping high machining accuracy and long-time automation can be realized.

The invention can also be applied to a configuration in which one material-recovery conveying device 41, one impurity removing device 43, one material-supply bucket 46, one material drying device 47, and one material-supply conveying device 48 are shared by a plurality of three-dimensional printers 1, the material-recovery conveying device 41 is switchably connected to the material-recovery buckets 30 of the three-dimensional printers 1 using a switching valve, the material-supply conveying device 48 is switchably connected to the material supply devices 3 of the three-dimensional printers 1 using a switching valve, non-sintered material powder including impurities is recovered from the material-recovery bucket 30 of the desired three-dimensional printer 1 at a desired timing depending on the states of the three-dimensional printers 1, the impurities are removed from the non-sintered material powder including impurities at a desired timing, the non-sintered material powder from which the impurities have been removed is dried before the non-sintered material powder is supplied to the material supply device 3 of the desired three-dimensional printer 1, and the non-sintered material powder from which impurities have been removed and which has been dried is supplied to the desired three-dimensional printer 1 at a desired timing. A plurality of three-dimensional printers 1 can operate automatically for a long time while keeping high machining accuracy and long-time automation can be realized.

According to the invention, since excess non-sintered material powder in the material-recovery bucket 30 has impurities removed therefrom at an appropriate timing, is dried, and is automatically supplied to the material supply device 3, it is possible to reduce an excessive amount of non-sintered material powder required for lamination molding. According to the invention, since excess non-sintered material powder in the material-recovery bucket 30 of a desired three-dimensional printer 1 among a plurality of three-dimensional printers 1 can have impurities removed therefrom at an appropriate timing, can be dried at an appropriate timing, and can be automatically supplied to the material supply device 3 of a desired three-dimensional printer 1 among the plurality of three-dimensional printers 1, it is possible to reduce an excessive amount of non-sintered material powder required when lamination molding is performed using a plurality of three-dimensional printers 1 together.

The embodiment was chosen in order to explain the principles of the invention and its practical application. Many modifications and variations are possible in light of the above teachings. It is intended that the scope of the invention be defined by the claims.

What is claimed is:

1. A three-dimensional printer comprising:
 a chamber that covers a molding region on a base and is filled with inert gas at a predetermined concentration;
 a table that is disposed in the molding region in the chamber and is movable vertically;

a material supply device that supplies non-sintered material powder onto the table to form a powder layer;

a powder retaining wall that surrounds the table to form a powder retaining space and retains the material powder supplied from the material supply device on the table;

a material-recovery bucket that accommodates, through a supply port thereof, excess material powder discharged from the powder retaining wall along with impurities;

an impurity removing device that sieves the material powder comprising impurities in the material-recovery bucket to remove the impurities;

a material-recovery conveying device that conveys the material powder comprising impurities from the material-recovery bucket to the impurity removing device;

a material-supply bucket that accommodates the material powder from which the impurities have been removed by the impurity removing device, comprises a material drying device that dries the accommodated material powder, and is disposed to separate from the base, the chamber and the material supply device so as not to cause a thermal influence on the base, the chamber and the material supply device; and a material-supply conveying device that conveys the dried material powder from the material-supply bucket to the material supply device, wherein at least the material-supply conveying device among the material-recovery conveying device and the material-supply conveying device comprises a suction device that suctions gas and solids together, and a cyclone type filter that separates the solids from the gas suctioned by the suction device, an exhaust port of the cyclone type filter is connected to the suction device, a suction port of the cyclone type filter is connected to a discharge port of the material-recovery bucket or a discharge port of the material-supply bucket, and a discharge port of the cyclone type filter is connected to a supply port of the impurity removing device or a supply port of the material supply device to cause separated-out solids to fall to an outside of the cyclone type filter, and the material powder from which the impurities have been removed by the impurity removing device is returned and recycled to the material supply device.

2. The three-dimensional printer according to claim 1, further comprising:

a shutter that opens and closes the supply port through which the material powder comprising impurities is supplied to the material-recovery bucket.

3. The three-dimensional printer according to claim 1, wherein the powder retaining wall has, on a lower part thereof, a lower powder discharging portion for discharging the material powder in the powder retaining space.

4. The three-dimensional printer according to claim 1, further comprising: a shutter that opens and closes a discharge port of the filter through which the solids separated from the gas are discharged.

5. The three-dimensional printer according to claim 1, wherein the material-recovery conveying device and the material-supply conveying device share the suction device.

6. The three-dimensional printer according to claim 1, wherein a plurality of three-dimensional printers, each of which is the three-dimensional printer, share at least the material-supply bucket, the material powder in the material-recovery bucket of the desired three-dimensional printer among the plurality of three-dimensional printers is accommodated in the material-supply bucket at a desired timing, and the material powder in the material-supply bucket is supplied to the material supply device of the desired three-dimensional printer among the plurality of three-dimensional printers at a desired timing.

* * * * *